United States Patent
Benson, Sr. et al.

(10) Patent No.: US 10,724,680 B2
(45) Date of Patent: Jul. 28, 2020

(54) PERSONAL DEVICE HOLDER

(71) Applicants: Robert Anthony Benson, Sr., Pine Ridge, SD (US); Dorraine Louise Benson, Pine Ridge, SD (US)

(72) Inventors: Robert Anthony Benson, Sr., Pine Ridge, SD (US); Dorraine Louise Benson, Pine Ridge, SD (US)

( * ) Notice: Subject to any disclaimer, the term of this patent is extended or adjusted under 35 U.S.C. 154(b) by 0 days.

(21) Appl. No.: 16/014,802

(22) Filed: Jun. 21, 2018

(65) Prior Publication Data

US 2019/0011080 A1    Jan. 10, 2019

Related U.S. Application Data

(60) Provisional application No. 62/604,452, filed on Jul. 6, 2017.

(51) Int. Cl.

| | |
|---|---|
| *F16M 13/00* | (2006.01) |
| *F16M 13/04* | (2006.01) |
| *F16M 13/02* | (2006.01) |
| F16M 11/38 | (2006.01) |
| F16M 11/10 | (2006.01) |

(52) U.S. Cl.
CPC ............ *F16M 13/04* (2013.01); *F16M 13/02* (2013.01); *F16M 11/10* (2013.01); *F16M 11/38* (2013.01)

(58) Field of Classification Search
CPC ........ A61H 19/00; A61H 19/34; A61H 19/44; A61H 19/50

USPC .............................................. 248/121, 122.1
See application file for complete search history.

(56) References Cited

U.S. PATENT DOCUMENTS

| | | | |
|---|---|---|---|
| 9,237,983 B2 * | 1/2016 | Milton | A61H 21/00 |
| 2003/0131450 A1 * | 7/2003 | Turesin | E05B 75/00 24/3.6 |
| 2018/0177676 A1 * | 6/2018 | Elliott | A61H 19/50 |
| 2019/0060161 A1 * | 2/2019 | Moreno | A61H 1/00 |

\* cited by examiner

*Primary Examiner* — Steven M Marsh
(74) *Attorney, Agent, or Firm* — Dale J. Ream

(57) ABSTRACT

A personal device holder for hands free positioning of a sexual device includes a primary support member having a proximal end and a distal end. The personal device holder include an auxiliary support member having a first end coupled to the proximal end of the primary support member and a second end opposite the first end, the auxiliary support member having a planar configuration and being normally positioned perpendicular to the primary support member. The primary support member defines a first aperture in communication with a peripheral edge of the proximal end thereof. The first ring assembly is pivotally coupled to the proximal end of the primary support member and positioned in the first aperture, the first ring assembly including a first ring having a flexible diameter having a 360 degree range of rotation and operable to receive the cap end of the sexual device in a friction fit arrangement.

18 Claims, 10 Drawing Sheets

PERSONAL DEVICE HOLDER

REFERENCE TO RELATED APPLICATIONS

This application claims the priority of provisional patent application U.S. Ser. No. 62/604,452 filed Jul. 6, 2017 titled Vibrator Holder or Vibrator Accessory 25 Different Vibrator Holders, 1 Swivel Ring, 1 Locking Bracket, which is incorporated in its entirety herein by reference.

BACKGROUND OF THE INVENTION

This invention relates generally to holding devices and, more particularly, to a personal device holder that is operable to secure and position one or more personal devices, such as a vibrator or dildo, for use without a user's hands.

There are multiple surveys now that a statistically significant number of women masturbate for personal enjoyment and to experience an orgasm(s). It is well known that sometimes female masturbation includes the use of a "personal sexual device" such as a vibrator, a wand, or other battery powered device that simulates a penis. The personal use of a device for this purpose, of course, requires use of her hand to hold the device in position for an extended period of time and this can become tedious and tiring.

Therefore, it would be desirable to have a personal device holder to which a sexual device, such as a vibrator, may be attached and rotatably positioned so that the sexual device can be used for stimulation without use of a user's hands. Further, introduction of a swivel ring allows a sexual device to move vertical and rotationally as desired and as the user moves around. The present invention enables a woman to exercise her legs, abdomen, and buttocks and having a very enjoyable workout. The invention make include one, two, or three swivel rings so that one, two, or three personal sexual devices may be positioned and used simultaneously—by one person or multiple persons.

SUMMARY OF THE INVENTION

A personal device holder for hands free positioning of a sexual device according to the present invention includes a primary support member having a proximal end and a distal end opposite the proximal end, the primary support member having an elongate planar configuration. The personal device holder include an auxiliary support member having a first end coupled to the proximal end of the primary support member and a second end opposite the first end, the auxiliary support member having a planar configuration and being normally positioned perpendicular to the primary support member. The primary support member defines a first aperture in communication with a peripheral edge of the proximal end thereof. The first ring assembly is pivotally coupled to the proximal end of the primary support member and positioned in the first aperture, the first ring assembly including a first ring having a flexible diameter having a 360 degree range of rotation and operable to receive the cap end of the sexual device in a friction fit arrangement.

Therefore, a general object of this invention is to provide a personal device holder for hands free positioning of a sexual device.

Another object of this invention is to provide a personal device holder, as aforesaid, operable to hold multiple personal devices for either individual use or simultaneous use by multiple persons.

Still another object of this invention is to provide a personal device holder, as aforesaid, for holding and rotatably positioning a vibrator or dildo.

Yet another object of this invention is to provide a personal device holder, as aforesaid, that may be folded for storage or transport.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
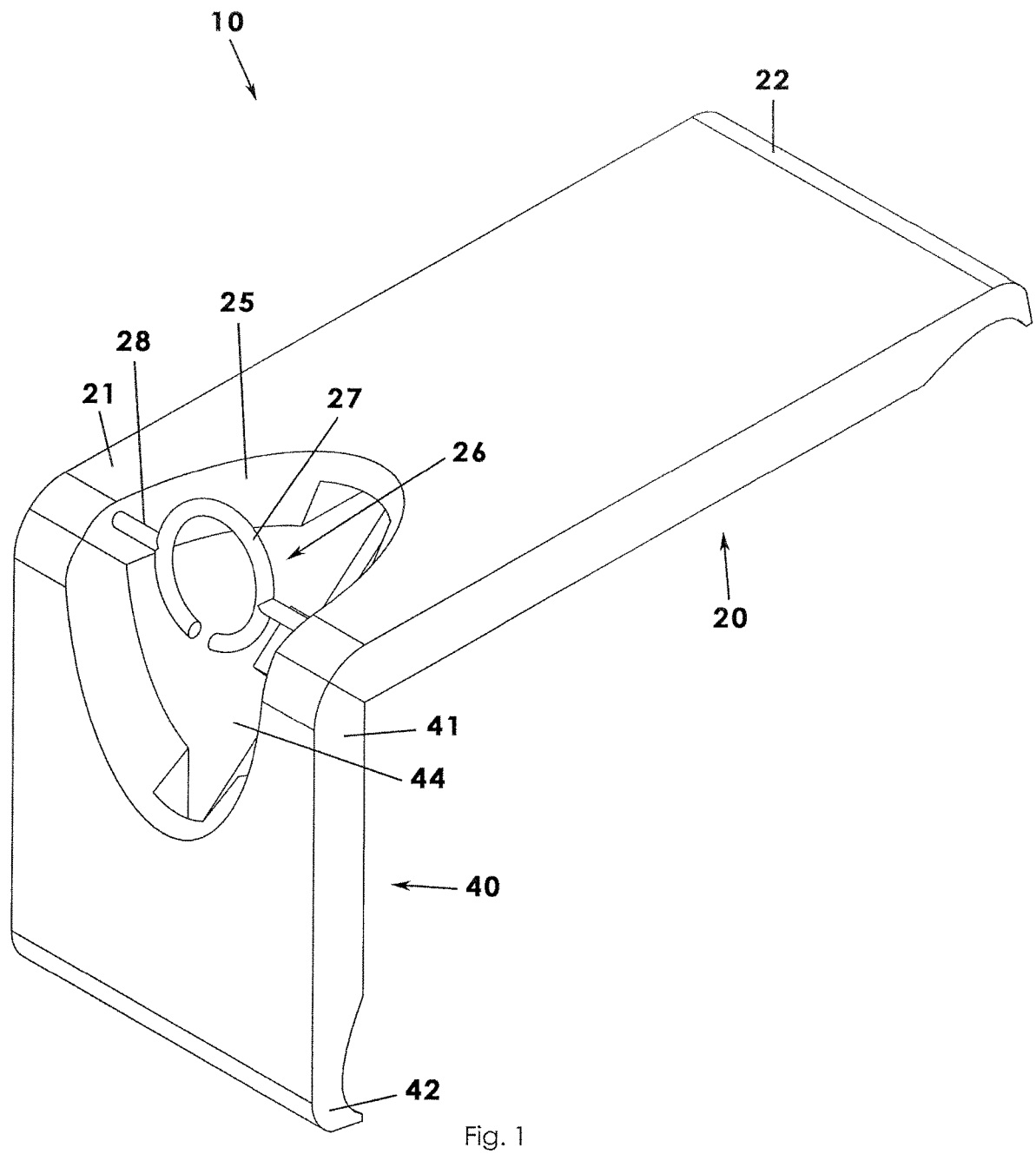
FIG. 1 is a perspective view of a personal device holder according to an embodiment of the present invention, illustrated having one ring assembly.
Figure 2:
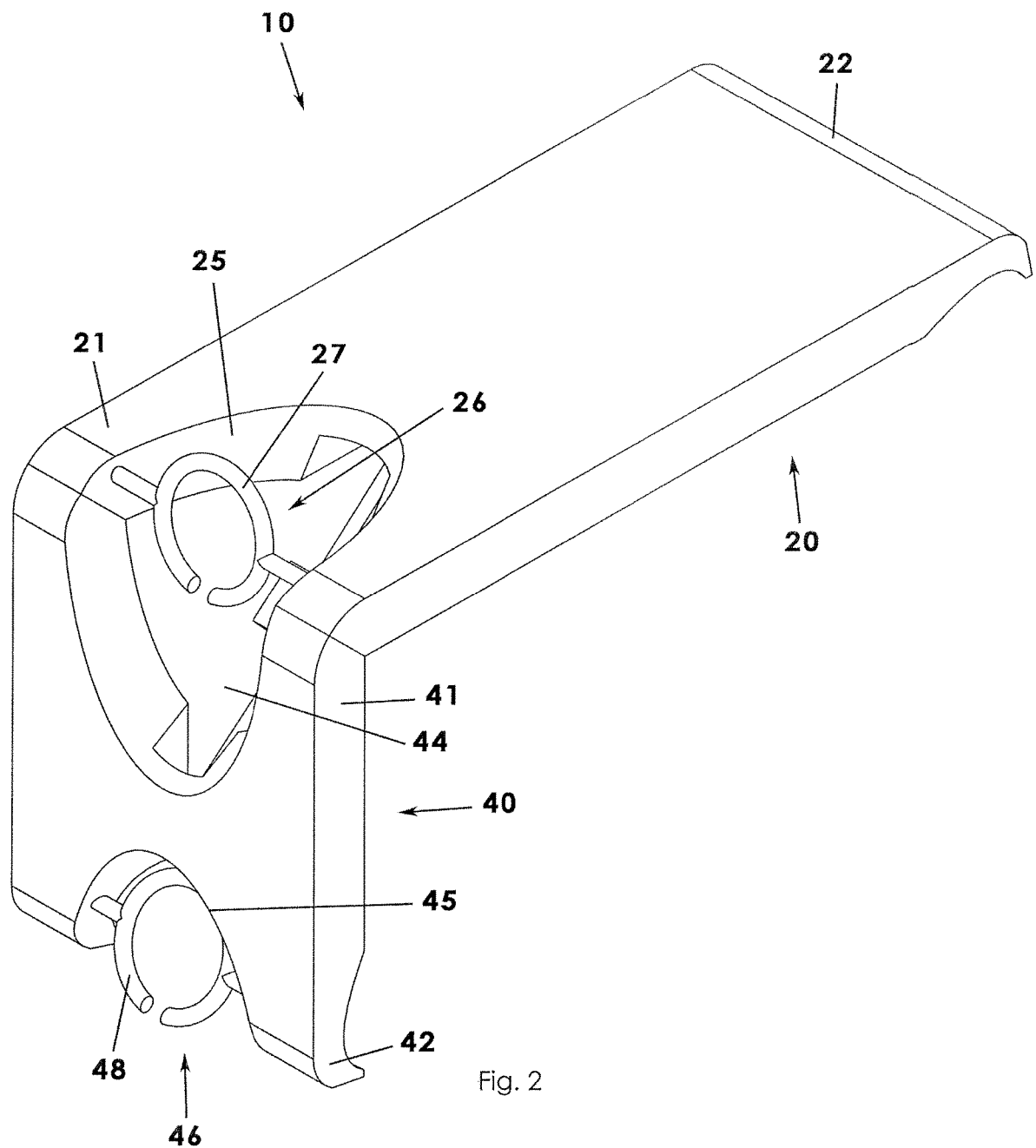
FIG. 2 is a perspective view of the personal device holder as in FIG. 1, illustrated having two ring assemblies.
Figure 3:
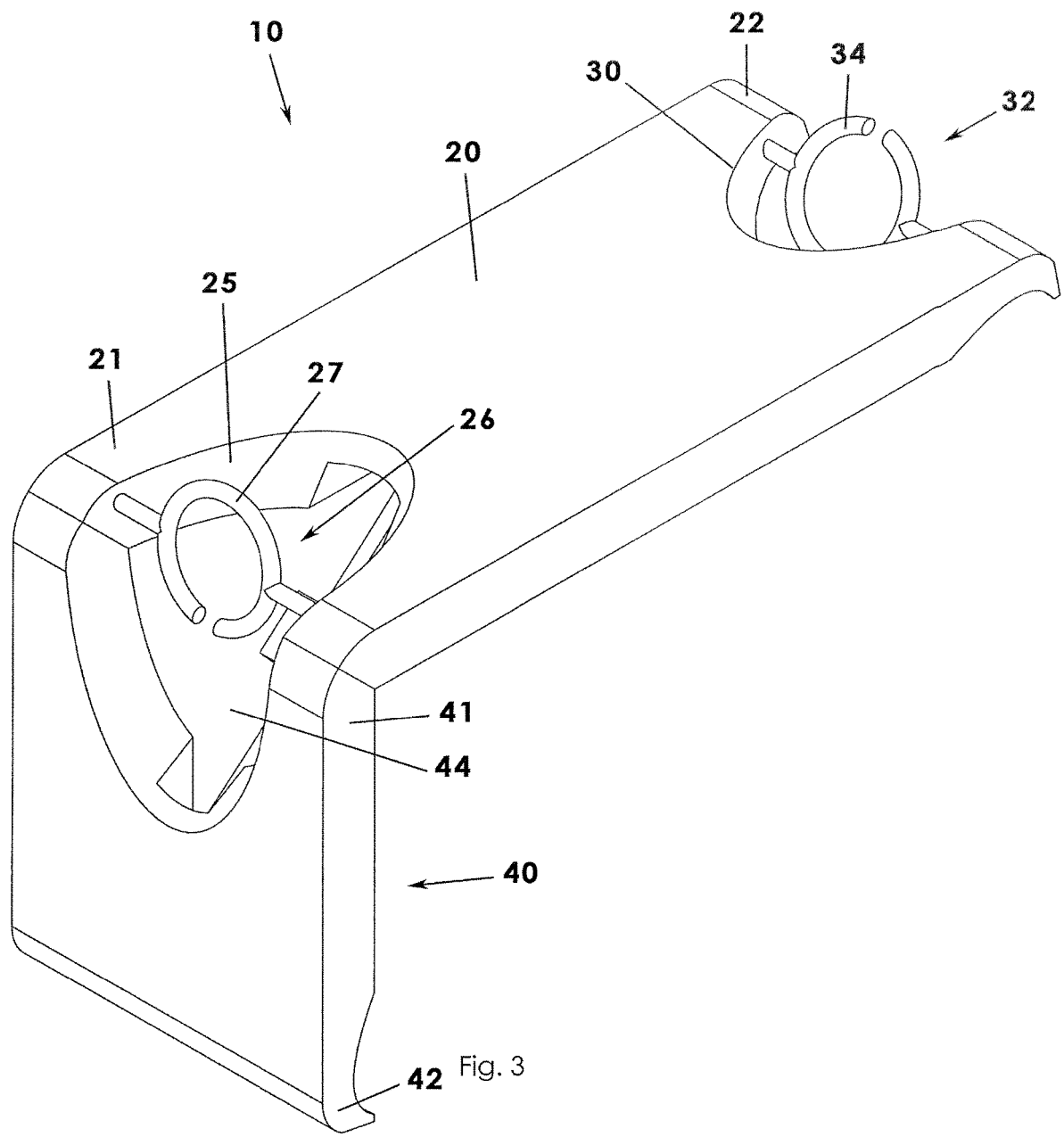
FIG. 3 is a perspective view of the personal device holder as in FIG. 1, illustrated having two ring assemblies.
Figure 4:
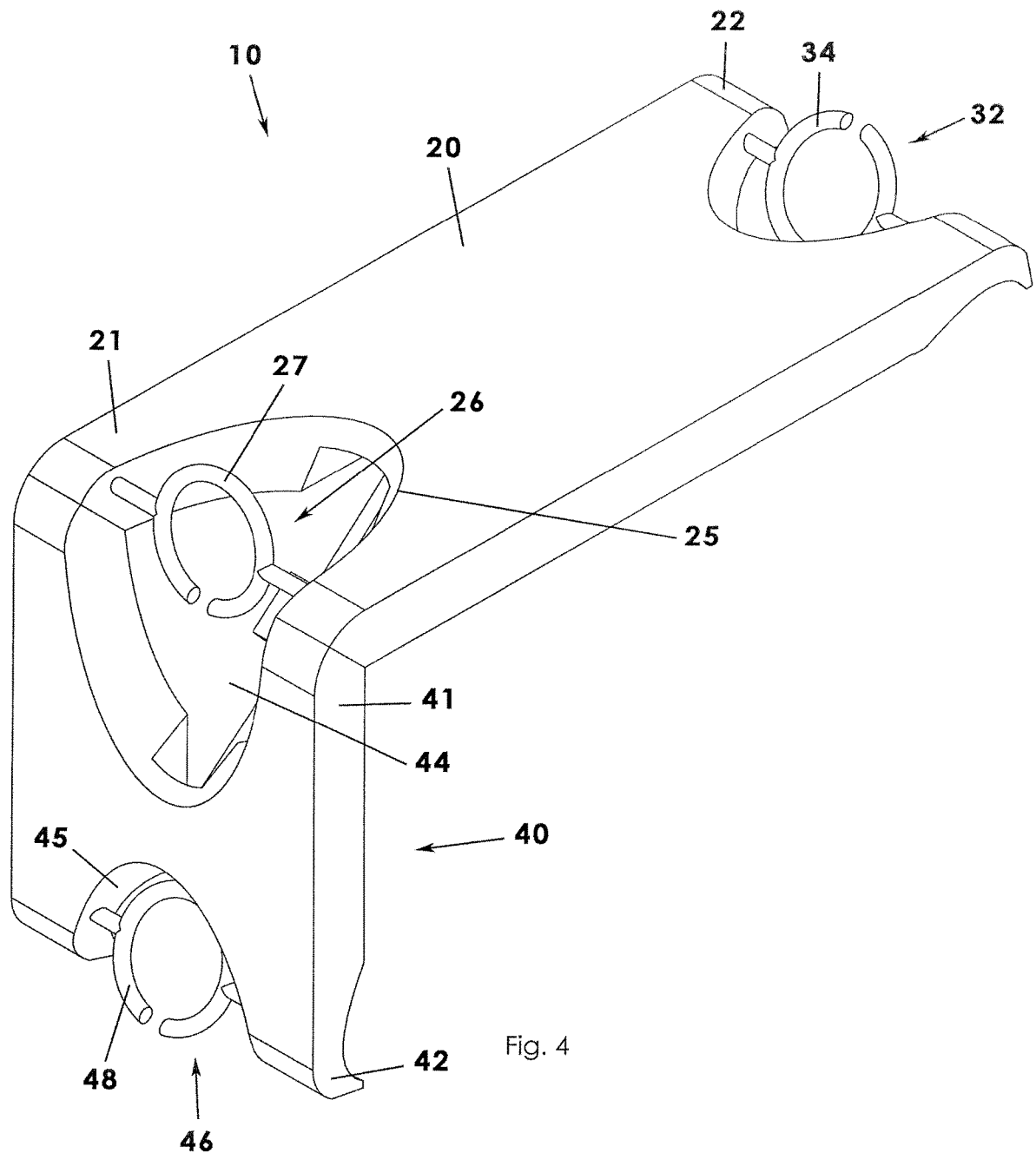
FIG. 4 is a perspective view of the personal device holder as in FIG. 1, illustrated having three ring assemblies.

A personal device holder for hands free positioning of a sexual device according to a preferred embodiment of the present invention will now be described with reference to FIGS. 1 to 10 of the accompanying drawings. The personal device holder 10 includes a primary support member 20, an auxiliary support member 40, and at least a first ring assembly 26 for holding a sexual device 12 (which may also be referred to as a personal device 12) such as a vibrator.

A single embodiment of the present invention is disclosed although the accompanying illustrations show the personal device holder 10 may be manufactured and sold with one, two, or three ring assemblies as will be described below. In all cases, a respective support member defines an aperture into which a ring assembly is situated and coupled.

The primary support member 20 is a panel having a flat or planar configuration and, preferably, has a rectangular configuration that defines a length and a width although other shapes may also work. The primary support member 20 has a proximal end 21 and a distal end 22 opposite the proximal end 21, each end havening a peripheral edge. The peripheral edge of the distal end 22 may also be referred to as a "free" end or "free" edge in that no other major component is attached thereto. The distal end 22 may be in the form or shape of an animal claw so as to grip and be stable on a support surface, especially upon a textile surface such as a bed sheet as will be described in greater detail later.

The auxiliary support member 40 is also a panel having a flat or planar configuration and, preferably, has a rectangular configuration that defines a length and a width although other shapes may also work. The primary support member 20 has a first end 41 operably coupled to the proximal end 21 of the primary support member 20 and a second end 42 opposite the first end 41, each end havening a peripheral edge. The peripheral edge of the second end 42 may also be referred to as a "free" end or "free" edge in that no other major component is attached thereto. The second end 42 may be in the form or shape of an animal claw so as to grip and be stable on a support surface, especially upon a textile surface such as a bed sheet as will be described in greater detail later.

Preferably, the width of the primary support member 20 is the same as the width of the auxiliary support member. By contrast, the length of the primary support member 20 is greater than the length of the auxiliary support member 40. Further, the first end of the auxiliary support member 40 is coupled to the primary support member 20 at a right angle thereto. In other words, the auxiliary support member 40 is perpendicular to the primary support member 20. In use, the second end 42 of the auxiliary support member 40 and the distal end 22 of the primary support member 20 are intended to bear against a support surface, such as a mattress or a sheet fitted thereto, so that, together, the support members 20, 40 of the personal device holder 10 defines a height and a generally V-shaped configuration.

Figure 5:
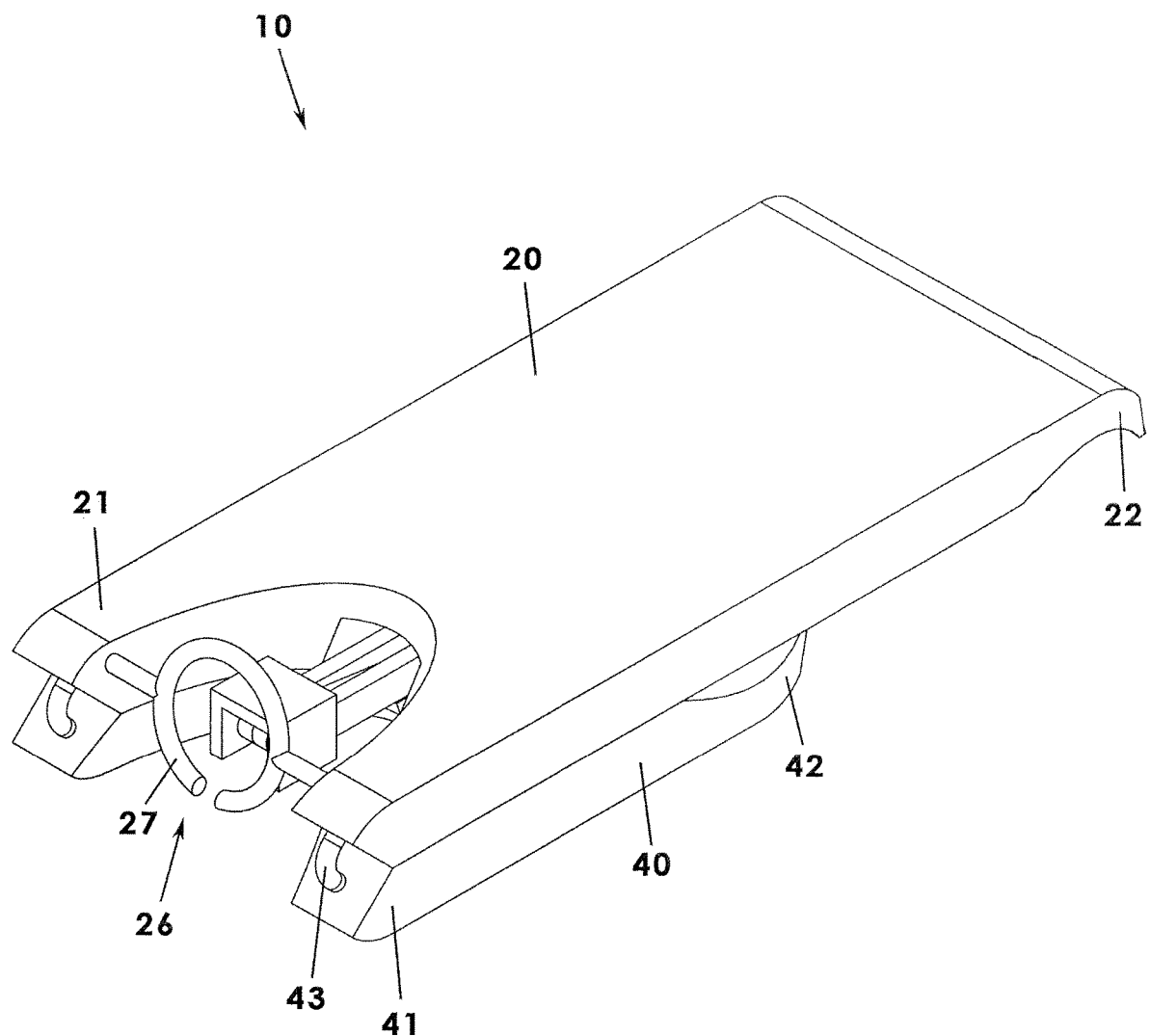
FIG. 5 is a perspective view of the personal device holder as in FIG. 1, illustrated in a folded or stowed configuration.

Further, the first end 41 of the auxiliary support member 40 may be pivotally coupled to the proximal end 21 of the primary support member 20 and, accordingly, may be pivotally movable between a deployed configuration that is generally perpendicular to the primary support member 20 (FIG. 1) and a retracted or folded configuration that is generally adjacent and parallel to a bottom surface of the primary support member 20 (FIG. 5). The folded configuration enables the personal device holder 10 to be stored or transported easily or just to lay flat on a support service if desired by a user. The auxiliary support member 40 may be pivotally coupled to the proximal end 21 of the primary support member 20 using a hinge (e.g. a piano hinge, living hinge, or the like), clamp, a clasp, a wire, a cord, a cable, complementary hook and loop fasteners, or other suitable fastener 43.

Figure 6:
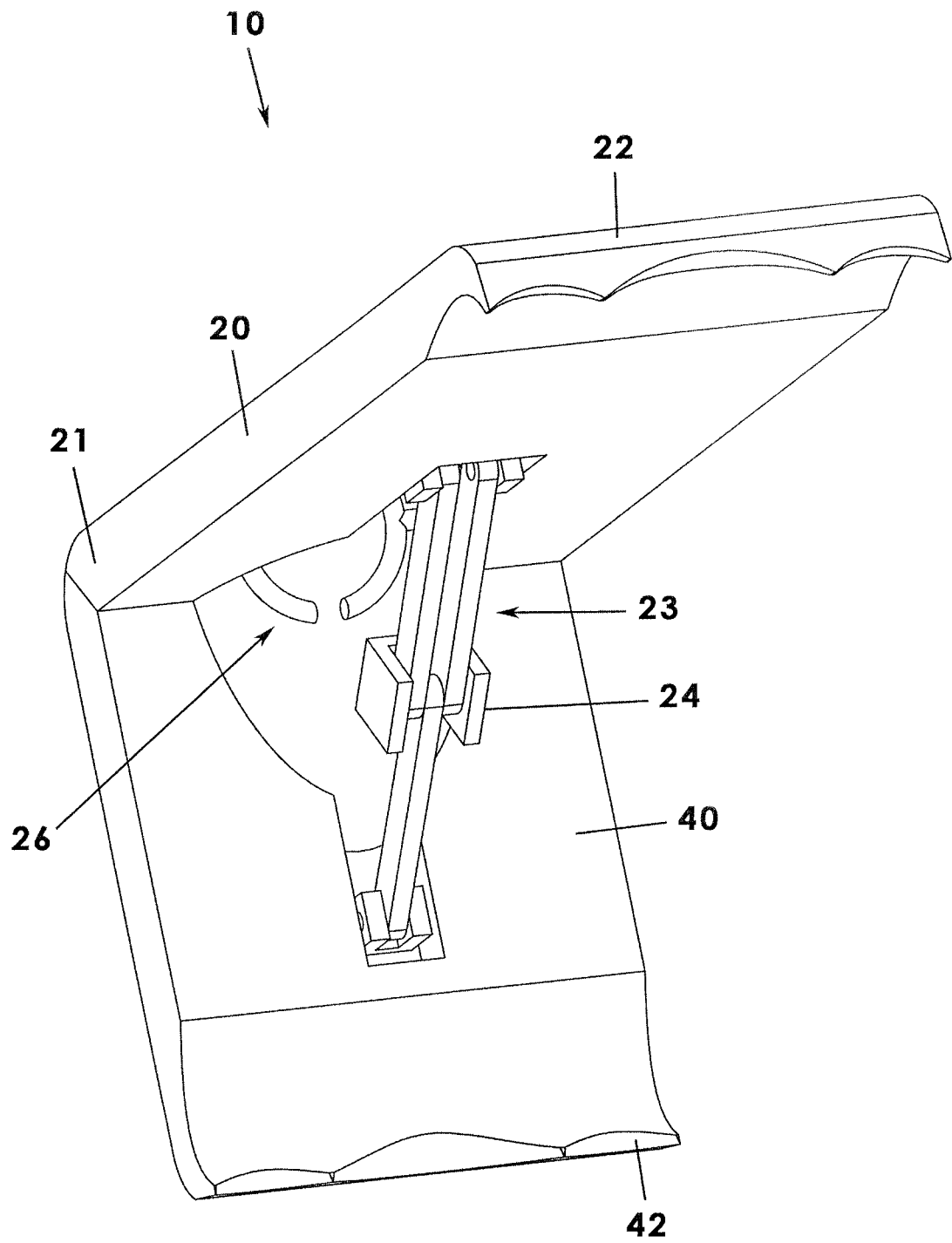
FIG. 6 is a perspective view of the personal device holder as in FIG. 1, illustrated in an open or deployed configuration.
Figure 7:
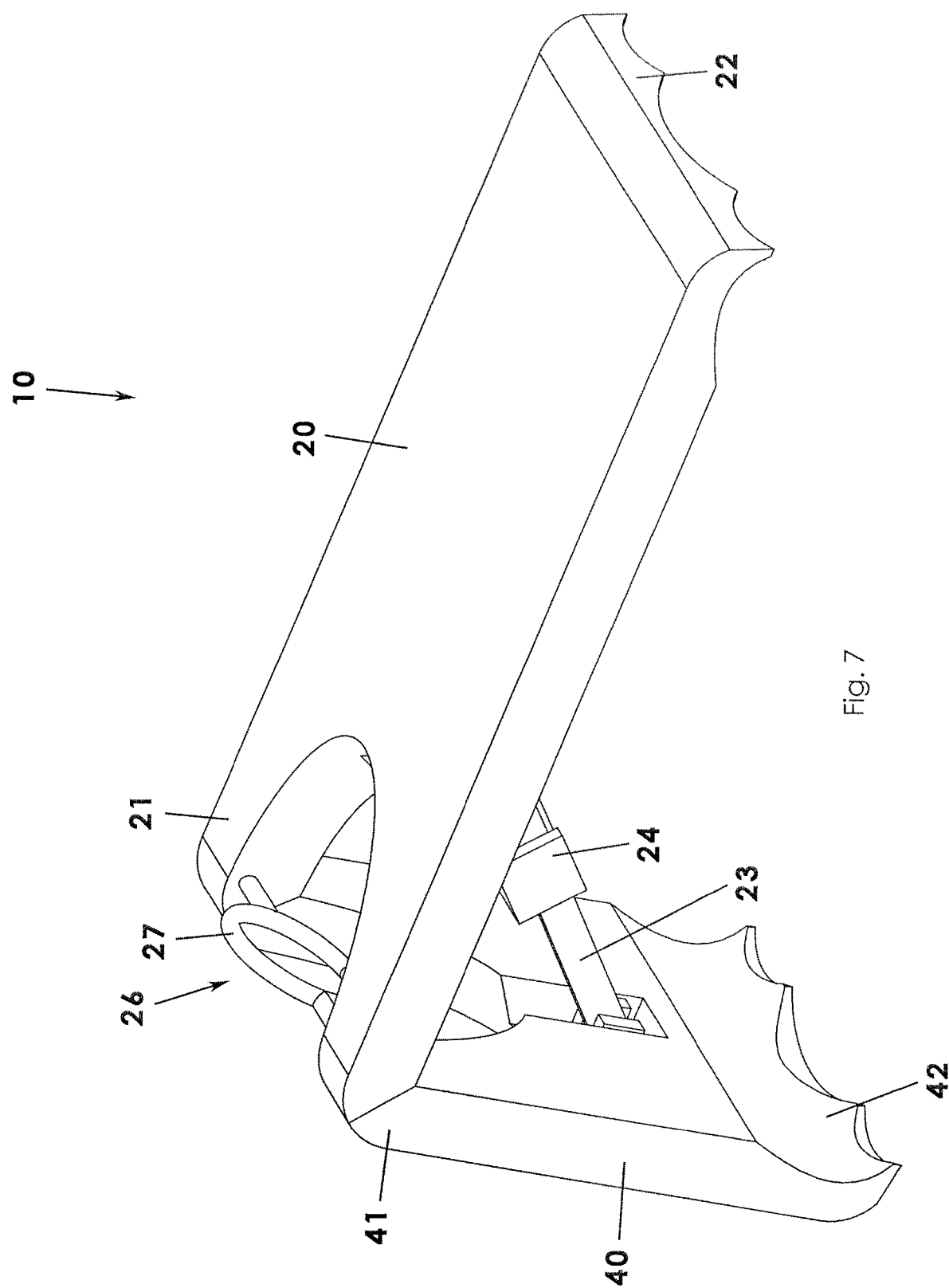
FIG. 7 is a perspective view from another angle of the personal device holder as in FIG. 6.
Figure 8:
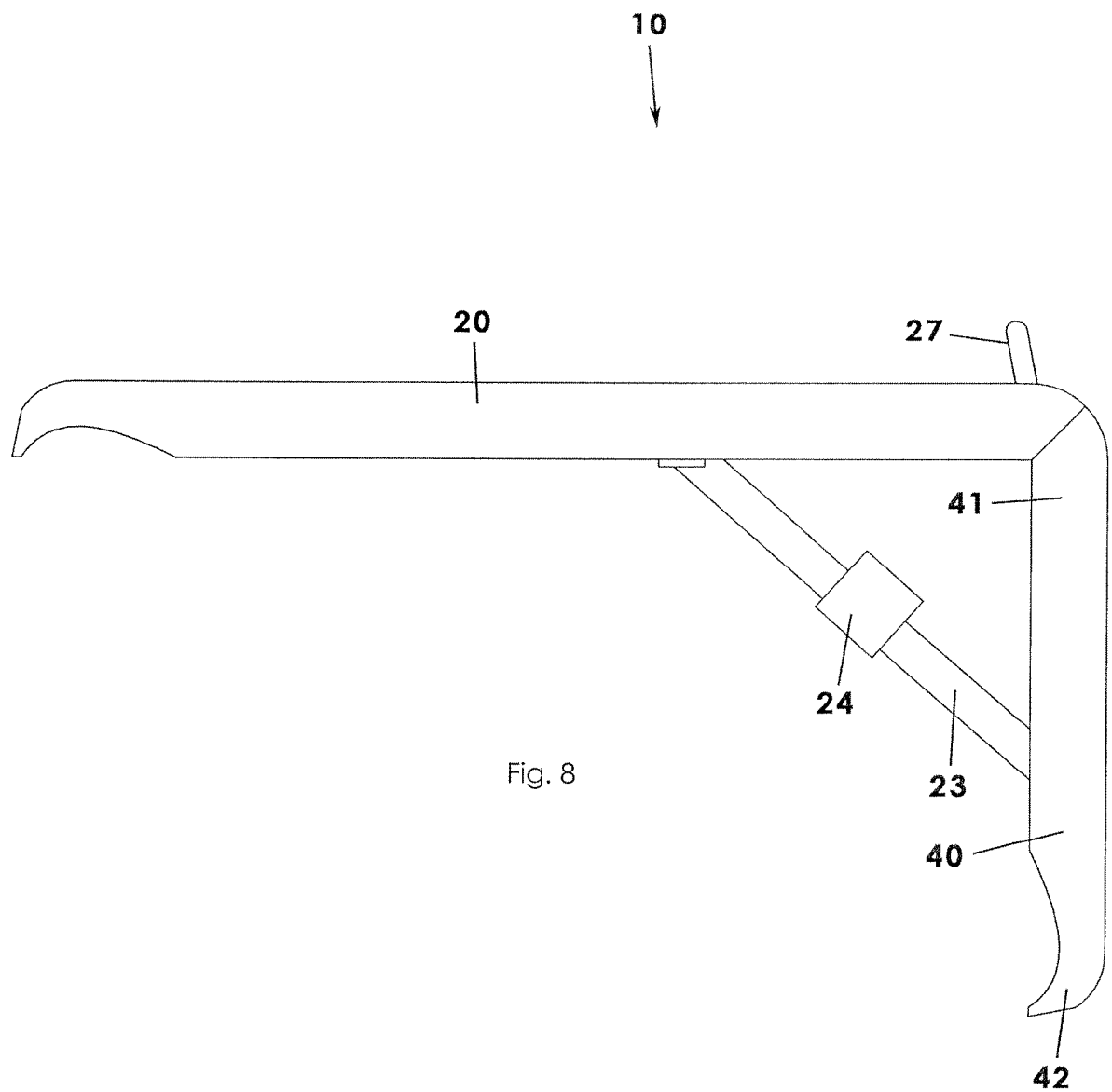
FIG. 8 is a perspective view from another angle of the personal device holder as in FIG. 6.
Figure 9:
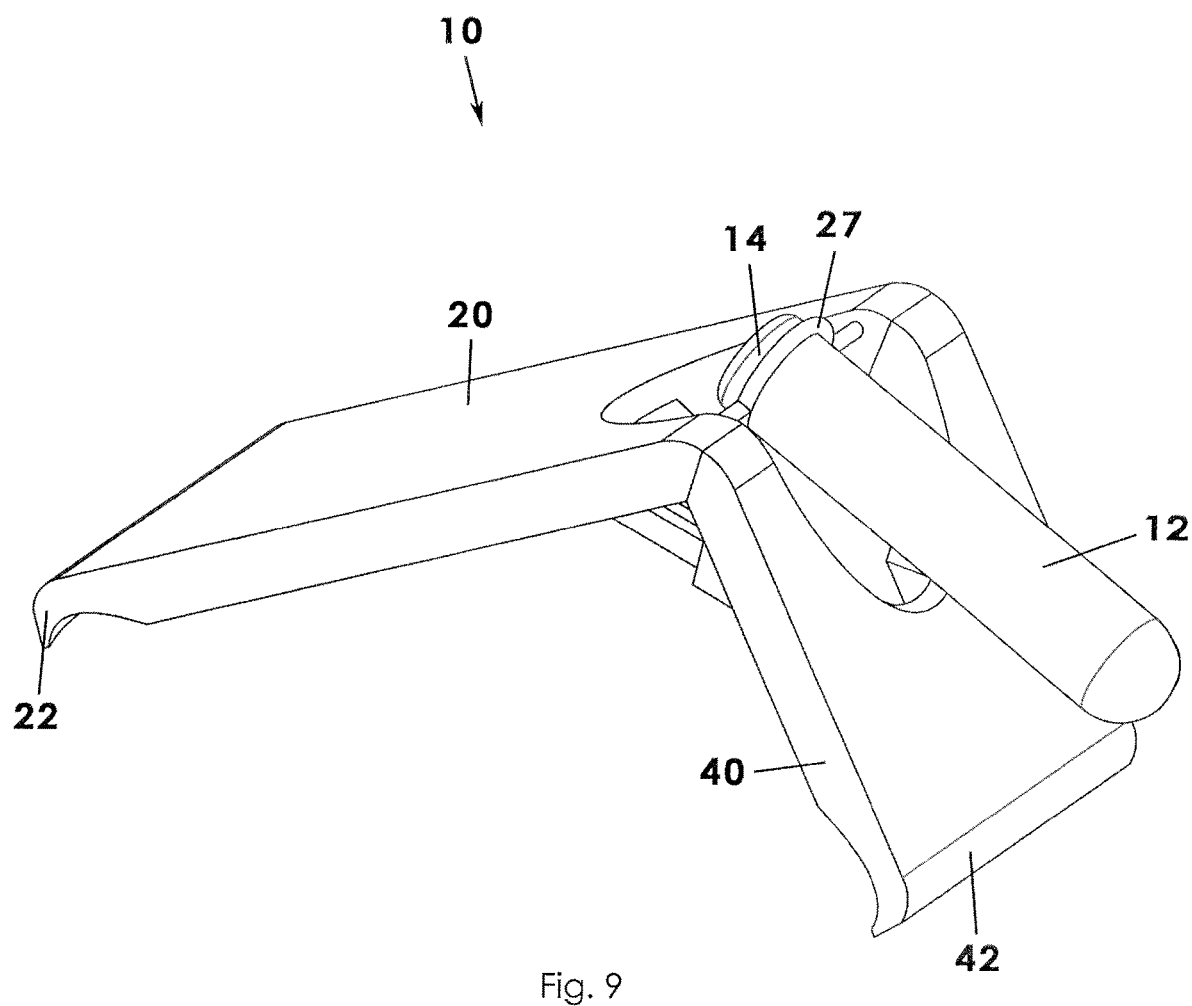
FIG. 9 is a perspective view of the personal device holder as in FIG. 1, illustrated in use with a personal device.

To enhance the stability of the support members at the deployed configuration described above, the personal device holder 10 may include a stabilizer bar 23 having opposed ends (i.e. a first end and a second end) coupled to bottom surfaces of the primary and auxiliary support members 20, 40, respectively, and extending therebetween (FIG. 6). In an embodiment, the stabilizer bar 23 may be hinged, such as with a spring hinge 24, such that the stabilizer bar 23 may be extended in a linear configuration to hold the support members in an open configuration, i.e. at the deployed configuration or may be folded so that the auxiliary support member 40 is moved to the retracted or stowed configuration (FIG. 5).

In a preferred embodiment, the primary support member 20 defines a first aperture 25 in communication with the proximal end 21 i.e. with the peripheral edge thereof. Stated another way, the peripheral edge of the proximal end 21 of the primary support member 20 defines the first aperture 25.

Figure 10:
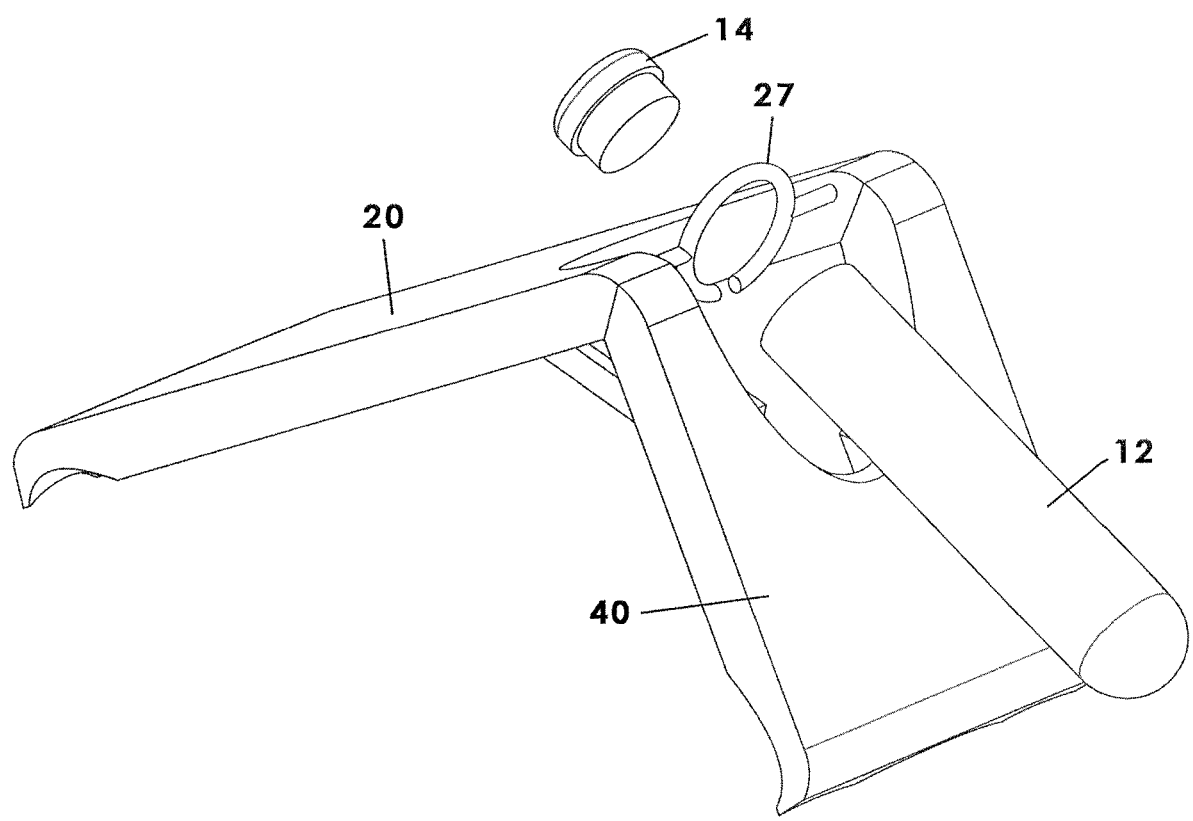
FIG. 10 is an exploded view of the personal device holder as in FIG. 9.

Then, the personal device holder 10 includes a first ring assembly 26 situated in the first aperture 25 of the primary support member 20. The first ring assembly 26 may include a first ring 27 sandwiched between a pair of opposed rod portions 28, the rod portions 28 being rotatably or axially coupled to respective sides of the primary support member 20. Consequently, the first ring 27 has 360 degrees of rotation, i.e. may be rotated freely as will be desirable when a personal device 12 is coupled to the first ring 27 and as will be described further later. The first ring 27 has a circular configuration and, preferably has a construction that allows it to have a variable diameter. More particularly, the first ring 27 includes or defines a cutout (FIG. 1) that leaves terminal ends unconnected, i.e. having a space therebetween. Thus, the diameter of the first ring 27 may flex as the personal device 12 or the cap end 14 thereof is inserted into the first ring 27 (FIG. 10). Receipt of the cap end 14 of the sexual device 12 is a friction fit arrangement, i.e. with no additional fasteners.

Similarly, the auxiliary support member 40 defines a first aperture 44 in communication with the peripheral edge of the first end 41. Stated another way, the peripheral edge of the first end 41 of the auxiliary support member 40 defines the additional aperture 44 of the auxiliary support member 40. The first aperture 44 is in communication with the first aperture 25 of the primary support member 20 and, together, enables the personal device 12 and first ring 27 to rotate up and down more easily and without conflict with either the primary support member 20 or auxiliary support member 40.

In addition, the auxiliary support member 40 defines an additional aperture 45 (also referred to as a "lower aperture") in communication with the peripheral edge of the second end 42. Stated another way, the peripheral edge of the second end 42 of the auxiliary support member 40 defines the additional aperture 45 of the auxiliary support member 40.

The personal device holder 10 includes a second ring assembly 46 situated in the additional aperture 44 of the auxiliary support member 40. The second ring assembly 46 may include a second ring 48 sandwiched between a pair of opposed rod portions, the rod portions being rotatably or axially coupled to respective sides of the auxiliary support member 40. Consequently, the second ring 48 has 360 degrees of rotation, i.e. may be rotated freely as will be desirable when a personal device 12 is coupled to the second ring 48 and as will be described further later. The second ring 48 has a circular configuration and, preferably has a construction that allows it to have a variable diameter. More particularly, the second ring 48 includes or defines a cutout (FIG. 1) that leaves terminal ends unconnected, i.e. having a space therebetween. Thus, the diameter of the second ring 48 may flex as the personal device 12 or the cap end 14 thereof is inserted into the second ring 48 (FIG. 10). Receipt of the cap end 14 of the sexual device 12 is a friction fit arrangement, i.e. with no additional fasteners. It will be understood that a personal device may be attached simultaneously to both the first ring 27 and the second ring 48.

In another aspect, the primary support member 20 defines a second aperture 30 in communication with the distal end 22 i.e. with the peripheral edge thereof. Stated another way, the peripheral edge of the distal end 22 of the primary support member 20 defines the second aperture 30.

Then, a third ring assembly 32 is situated in the second aperture 30 of the primary support member 20. The third ring assembly 32 may include a third ring 34 sandwiched between a pair of opposed rod portions, the rod portions being rotatably or axially coupled to respective sides of the primary support member 20. Consequently, the third ring 34 has 360 degrees of rotation, i.e. may be rotated freely as will be desirable when a personal device 12 is coupled to the third ring 34 and as will be described further later. The third ring 34 has a circular configuration and, preferably has a construction that allows it to have a variable diameter. More particularly, the third ring 34 includes or defines a cutout (FIG. 1) that leaves terminal ends unconnected, i.e. having a space therebetween. Thus, the diameter of the third ring 34 may flex as the personal device 12 or the cap end 14 thereof is inserted into the third ring 34 (FIG. 10). Receipt of the cap end 14 of the sexual device 12 is a friction fit arrangement, i.e. with no additional fasteners. It will be understood that a personal device may be attached simultaneously to the first ring 27, the second ring 48, and third ring 34. Each may be rotated and positioned in a direction as desired.

In use, the cap end 14 of a personal device may be removed and the personal device positioned adjacent a respective ring and then the cap end returned to its normal attached position with the ring sandwiched therebetween as shown in FIG. 10. Once attached to a respective ring, the personal device may be positioned for use upon the user's body. More particularly, the personal device holder 10 may be laid on a mattress, for instance between the legs of a female user, and used hands free.

It is understood that while certain forms of this invention have been illustrated and described, it is not limited thereto except insofar as such limitations are included in the following claims and allowable functional equivalents thereof.

The invention claimed is:

1. A personal device holder for hands free positioning of a sexual device having a cap end, said personal device holder comprising:
    a primary support member having a proximal end and a distal end opposite said proximal end, said primary support member having an elongate planar configuration;
    an auxiliary support member having a first end coupled to said proximal end of said primary support member and a second end opposite said first end, said auxiliary support member having a planar configuration and being normally positioned perpendicular to said primary support member;
    wherein said primary support member defines a first aperture in communication with a peripheral edge of said proximal end thereof;
    a first ring assembly pivotally coupled to said proximal end of said primary support member and positioned in said first aperture, said first ring assembly including a first ring having a flexible diameter having a 360 degree range of rotation and operable to receive the cap end of the sexual device in a friction fit arrangement.

2. The personal device holder as in claim 1, wherein:
    said primary holder member has a rectangular configuration and has a length that is longer than a width thereof;
    said auxiliary support member has a rectangular configuration and extends downwardly away from said proximal end of said primary support member.

3. The personal device holder as in claim 1, wherein:
    said auxiliary support member defines a first aperture in communication with a peripheral edge of said first end thereof and in communication with said first aperture of said primary support member;
    said first aperture of said primary support member and said first aperture of said auxiliary support member, together enable the sexual device, when received by said first ring, to rotate up and down.

4. The personal device holder as in claim 1, wherein said first end of said auxiliary support member is pivotally coupled to said proximal end of said primary support member such that said auxiliary support member is movable between a deployed configuration at about a 90 degree angle relative to said primary support member and a retracted configuration parallel and adjacent a bottom surface of said primary support member.

5. The personal device holder as in claim 4, wherein said first end of said auxiliary support member is pivotally coupled to said proximal end of said primary support member with a fastener taken from a group consisting of a hinge, cord, cable, clasp, and wire.

6. The personal device holder as in claim 5 further comprising a stabilizer bar having a first end coupled to a bottom surface of said primary support member and a second end coupled to a rear surface of said auxiliary support member, said stabilizer bar having a linear shape at said deployed configuration and having a folded shape at said retracted configuration.

7. The personal device holder as in claim 1, wherein:
    said distal end of said primary support member includes a claw-shaped configuration that enhances grip and stability when placed on a textile surface;
    said second end of said auxiliary includes a claw-shaped configuration that enhances grip and stability when placed on a textile surface.

8. The personal device holder as in claim 1, wherein said first ring is mounted between opposed rod portions that are axially connected to said primary support member, said first ring having a circular shape defining a cutout between terminal ends thereof so that said first ring has said flexible diameter.

9. The personal device holder as in claim 1, wherein a peripheral edge of said second end of said auxiliary support member defines an aperture;
    said personal device holder further comprising a second ring assembly pivotally coupled to said second end of said auxiliary support member and positioned in said aperture of said auxiliary support member, said second ring assembly including a second ring having a flexible diameter having a 360 degree range of rotation and operable to receive the cap end of the sexual device in a friction fit arrangement.

10. The personal device holder as in claim 9, wherein a peripheral edge of said distal end of said primary support member defines a second aperture;
    said personal device holder further comprising a third ring assembly pivotally coupled to said distal end of said auxiliary support member and positioned in said second aperture of said primary support member, said third ring assembly including a third ring that has a flexible diameter having a 360 degree range of rotation and being operable to receive the cap end of the sexual device in a friction fit arrangement.

11. A personal device holder for hands free positioning of a sexual device having a cap end, said personal device holder comprising:
    a primary support member having a proximal end and a distal end opposite said proximal end, said primary support member having an elongate planar configuration;
    an auxiliary support member having a first end coupled to said proximal end of said primary support member and a second end opposite said first end, said auxiliary support member having a planar configuration and being normally positioned perpendicular to said primary support member;
    wherein said primary support member defines a first aperture in communication with a peripheral edge of said proximal end thereof;

a first ring assembly pivotally coupled to said proximal end of said primary support member and positioned in said first aperture, said first ring assembly including a first ring having a flexible diameter having a 360 degree range of rotation and operable to receive the cap end of the sexual device in a friction fit arrangement;

wherein:
said auxiliary support member defines a first aperture in communication with a peripheral edge of said first end thereof and in communication with said first aperture of said primary support member;
said first aperture of said primary support member and said first aperture of said auxiliary support member, together enable the sexual device, when received by said first ring, to rotate up and down;
wherein a peripheral edge of said second end of said auxiliary support member defines an aperture;
a second ring assembly pivotally coupled to said second end of said auxiliary support member and positioned in said aperture of said auxiliary support member, said second ring assembly including a second ring having a flexible diameter having a 360 degree range of rotation and operable to receive the cap end of the sexual device in a friction fit arrangement.

12. The personal device holder as in claim 11, wherein a peripheral edge of said distal end of said primary support member defines a second aperture;
said personal device holder further comprising a third ring assembly pivotally coupled to said distal end of said auxiliary support member and positioned in said second aperture of said primary support member, said third ring assembly including a third ring that has a flexible diameter having a 360 degree range of rotation and being operable to receive the cap end of the sexual device in a friction fit arrangement.

13. The personal device holder as in claim 12, wherein:
said primary holder member has a rectangular configuration and has a length that is longer than a width thereof;
said auxiliary support member has a rectangular configuration and extends downwardly away from said proximal end of said primary support member.

14. The personal device holder as in claim 11, wherein said first end of said auxiliary support member is pivotally coupled to said proximal end of said primary support member such that said auxiliary support member is movable between a deployed configuration at about a 90 degree angle relative to said primary support member and a retracted configuration parallel and adjacent a bottom surface of said primary support member.

15. The personal device holder as in claim 14, wherein said first end of said auxiliary support member is pivotally coupled to said proximal end of said primary support member with a fastener taken from a group consisting of a hinge, cord, cable, clasp, and wire.

16. The personal device holder as in claim 11 further comprising a stabilizer bar having a first end coupled to a bottom surface of said primary support member and a second end coupled to a rear surface of said auxiliary support member, said stabilizer bar having a linear shape at said deployed configuration and having a folded shape at said retracted configuration.

17. The personal device holder as in claim 11, wherein:
said distal end of said primary support member includes a claw-shaped configuration that enhances grip and stability when placed on a textile surface;
said second end of said auxiliary includes a claw-shaped configuration that enhances grip and stability when placed on a textile surface.

18. The personal device holder as in claim 11, wherein:
said first ring is mounted between opposed rod portions that are axially connected to said primary support member, said first ring having a circular shape defining a cutout between terminal ends thereof so that said first ring has said flexible diameter;
said second ring is mounted between opposed rod portions that are axially connected to said auxiliary support member, said second ring having a circular shape defining a cutout between terminal ends thereof so that said second ring has said flexible diameter.

* * * * *